(12) United States Patent
Rasmussen et al.

(10) Patent No.: US 8,084,138 B2
(45) Date of Patent: Dec. 27, 2011

(54) POLYETHYLENE PRODUCT AND A METHOD OF PROVIDING A PRODUCT, SUCH AS A LASER WELDED POLYETHYLENE PRODUCT

(75) Inventors: Frank Berg Rasmussen, Smorum (DK); Ingrid Laesoe Fink, Lynge (DK); Kim Bager, Lyngby (DK); Carsten Thirstrup, Charlottenlund (DK)

(73) Assignee: Coloplast A/S, Humlebaek (DK)

( * ) Notice: Subject to any disclaimer, the term of this patent is extended or adjusted under 35 U.S.C. 154(b) by 1091 days.

(21) Appl. No.: 11/578,367

(22) PCT Filed: Apr. 13, 2005

(86) PCT No.: PCT/DK2005/000251
§ 371 (c)(1),
(2), (4) Date: Aug. 30, 2007

(87) PCT Pub. No.: WO2005/099960
PCT Pub. Date: Oct. 27, 2005

(65) Prior Publication Data
US 2008/0145682 A1    Jun. 19, 2008

(30) Foreign Application Priority Data

Apr. 13, 2004   (DK) ................................. 2004 00585

(51) Int. Cl.
   *B32B 1/08*     (2006.01)
   *B32B 27/00*    (2006.01)
   *A61F 5/44*     (2006.01)

(52) U.S. Cl. ................. 428/500; 428/35.2; 604/337

(58) Field of Classification Search .................. None
See application file for complete search history.

(56) References Cited

U.S. PATENT DOCUMENTS

| | | | |
|---|---|---|---|
| 4,879,450 A | 11/1989 | Valentin et al. | |
| 5,702,771 A | 12/1997 | Shipston et al. | |
| 5,840,147 A * | 11/1998 | Grimm | 156/272.2 |
| 6,229,114 B1 | 5/2001 | Andrews et al. | |
| 6,248,974 B1 | 6/2001 | Wai | |
| 6,326,450 B1 | 12/2001 | Shipston et al. | |
| 6,492,019 B1 | 12/2002 | Shipston et al. | |
| 6,656,315 B2 | 12/2003 | Sallavanti et al. | |
| 6,749,933 B2 | 6/2004 | Dries et al. | |
| 6,841,024 B2 | 1/2005 | Drummond et al. | |
| 7,166,669 B2 | 1/2007 | Joachimi et al. | |
| 7,201,963 B2 | 4/2007 | Hartley et al. | |
| 2003/0003296 A1* | 1/2003 | Dries et al. | 428/336 |
| 2004/0030384 A1 | 2/2004 | Wissman | |
| 2004/0056006 A1 | 3/2004 | Jones et al. | |
| 2004/0080573 A1* | 4/2004 | Buchanan et al. | 347/47 |
| 2004/0089640 A1* | 5/2004 | Bager et al. | 219/121.64 |
| 2004/0147887 A1 | 7/2004 | Hagstroem et al. | |
| 2004/0150688 A1 | 8/2004 | Kwan et al. | |
| 2004/0234899 A1 | 11/2004 | Toriumi et al. | |
| 2005/0008854 A1 | 1/2005 | Seeger et al. | |

FOREIGN PATENT DOCUMENTS

| | | |
|---|---|---|
| DE | 101 58 016 C1 | 1/2003 |
| DE | 44 32 081 A1 | 5/2005 |
| EP | 0 126 787 A1 | 12/1984 |
| EP | 0 476 865 | 3/1992 |
| EP | 1 331 635 | 7/2003 |
| GB | 1 528 452 | 10/1978 |
| WO | WO 00/20157 | 4/2000 |
| WO | WO 02/00144 A1 | 1/2002 |
| WO | 02/23962 | 3/2002 |
| WO | 03/007080 | 1/2003 |
| WO | WO 2004/052626 A1 | 6/2004 |
| WO | 2005/070360 | 8/2005 |

OTHER PUBLICATIONS

BASF AG, "Transmission Laser-Welding of Thermoplastics", AWETA Thermoplaste, Ludwigshafen, XP-002312668, pp. 1-8, Feb. 1, 2000.
Bachmann, et al. "Laser Welding of Polymers Using High Power Diode Lasers", Proceedings of SPIE, vol. 4637, pp. 505-518, XP002312667, 2002.
XP-002312700, "Laser Beam Welding of Thermoplastics", Russek et al, The Int'l Society for Optical Engineering; Photon Processing in Microelectronics and Photonics II, vol. 4977, pp. 458-472, 2003.

* cited by examiner

*Primary Examiner* — Sheeba Ahmed
(74) *Attorney, Agent, or Firm* — Jacobson Holman PLLC (57) ABSTRACT

A method of decreasing the penetration depth of radiation provided to an interface, such as a surface, or a predetermined volume in a polyethylene (PE) element, where the PE element has a scattering coefficient larger than one tenth of an absorption coefficient thereof so that the radiation not absorbed at the interface or in the volume but transmitted further into the PE element is at least partly reflected toward the interface/volume. The radiation intensity is higher in the volume and the absorption coefficient may be reduced while retaining the total absorption in the volume.

19 Claims, 2 Drawing Sheets

POLYETHYLENE PRODUCT AND A METHOD OF PROVIDING A PRODUCT, SUCH AS A LASER WELDED POLYETHYLENE PRODUCT

This is a nationalization of PCT/DK2005/000251 filed 13 Apr. 2005 and published in English, claiming the benefit of U.S. application Ser. No. 10/822,861 filed on 13 Apr. 2004.

BACKGROUND OF THE INVENTION

1. Field of the Invention

The present invention relates, in general, to the use of radiation for initiating or providing an effect and in particular to a manner and a polyethylene element which facilitates the concentration of a radiation intensity to a predetermined volume or at an interface or surface.

2. Description of the Related Art

Normally, if absorption is desired in a material or an element in order to generate heat or other changes, an absorber is added to facilitate the absorption. However, absorbers have a tendency, in addition to their main function of absorption, to change other physical or chemical parameters of the material in a non-desired manner. One such parameter may be the colour of the means or material, and another may be the mechanical strength, which may both be adversely affected by the presence of the absorber. Also, the normally used absorbers can be relatively costly.

In order to reduce these "side effects", less absorber may be used. This may, however, reduce the overall absorption to a level where the desired effect is not seen.

The use of radiation for performing or triggering different processes may e.g. be seen in: GB 1528452, U.S. Pat. No. 5,702,771, U.S. Pat. No. 6,326,450, U.S. Pat. No. 6,492,019, U.S. Pat. No. 6,248,974, U.S. Pat. No. 6,229,114, WO 02/23962, EP 1331635, EP 0476865, EP 0126787, WO 00/20157, WO 03/007080, and DE 101 58 016 as well as in Russek U A et al: "laser beam welding of thermoplastics, Proc. SPIE—the international society for optical engineering: photon processing in microelectronics and photonics II: San jose, CA, USA, Jan. 27-30 2003, vol. 4977, 2003, pages 458-472, Bachmann F G: "laser welding of polymers using high-power diode lasers", Proc of SPIE, vol. 4637, 2002, p: 505-518, and "laserstrahlschweissen von Thermoplasten in Durchstrahlverfahren" 1 Feb. 2000, BASF A G, AWETA THERMOPLASTE, Ludwigshafen, Del.

One particular application is laser welding, where radiation is transmitted to an interface between two abutting materials having different absorption of the radiation used. The radiation is transmitted through the material having the lower absorption of the radiation so that, due to its higher absorption of the radiation, the other material is heated at the interface to a degree where melting and welding occurs.

It has been found, however, that problems may occur in laser welding due to the relation between the absorption required to obtain the heating and the effects of the radiation in areas away from the interface. In fact, weakening or decolouration of the material may be the result of the welding due to radiation not absorbed close to the interface heating the material further into the highly absorbing material.

Thus, a number of situations exist where the absorption desired/obtainable is not sufficient to obtain the desired effect (such as heat, damping of the radiation or the like) at/in the interface/volume desired and especially for soft thermoplastic materials such as polyethylene (PE), low density polyethylene (LDPE), high density polyethylene (HDPE) and the like.

In a number of other applications, where a photo- or heat-induced process is desired, the same problem may occur. Radiation not absorbed at the desired positions may damage materials at other positions.

SUMMARY OF THE INVENTION

The present invention relates to a solution to this problem in that it has been found that if a means or a material in addition to showing absorption at the wavelength in question also shows a not insignificant scattering, radiation transmitted away from the area/surface/-interface where the effect of the radiation is desired is not merely absorbed in other parts of the material (or output there from), but part of the transmitted radiation is scattered back toward the area/surface/interface in question. Consequently, a higher radiation intensity and a higher radiation absorption are experienced at that area/surface/interface.

The overall effect of the scattering is a limitation or reduction in the penetration depth or distance of the radiation into the means. The scattering will act to scatter the radiation also back toward the volume where the radiation is desired. Naturally, as will also be seen below, the scattering may be selected (also inside the means) in order to provide the reflection at the desired positions in order to actually tailor the means to the application in question.

In a first aspect, the invention relates to a method of providing a product, the method comprising:
    providing a PE element having an absorption coefficient, $\mu a$, and a scattering coefficient, $\mu s$, at a predetermined wavelength, wherein $\mu s > (1/10) * \mu a$,
    providing radiation comprising radiation at the predetermined wavelength to a predetermined volume at or near an interface or surface of the PE element.

In the present context, the radiation may be monochromatic radiation, such as laser radiation, having the predetermined wavelength, or it may be polychromatic radiation. There need be no direct demands as to the radiation source. The wavelength may be any wavelength. In fact, radiation may be used having a plurality of wavelengths in that most materials have absorptions at multiple wavelengths, so that the overall radiation intensity, heating, or other effect, may be obtained also using multiple wavelengths.

An interface may be an external surface of the PE element or may be an internal interface, such as between two parts of the PE element. The predetermined volume receiving the radiation is present at the interface where the radiation is desired. The predetermined volume will be at the interface but may just as well be at an outer surface of the PE element as inside it. The volume is normally defined by the radiation and the intensity thereof as a volume where the desired effect takes place, such as where the radiation intensity is large enough. However, a number of other manners exist of defining this volume. The effect desired will then take place at the volume/interface. Depending on the situation (see below), the effect may be a surface-related effect or a bulk-related effect.

Naturally, the absorption coefficient, $\mu a$, and the scattering coefficient, $\mu s$, are two of the fundamental optical properties describing radiative transport in any medium. They are defined in standard textbooks such as C. F. Bohren and D. R. Huffman, 'Absorption and Scattering of Light by Small Particle', John Wiley & Sons, Inc. 1983, ISBN 0-471-05772-X. The absorption and scattering coefficients can be measured experimentally e.g. using the so-called integrating sphere method described e.g. by B. C. Wilson in 'Optical-Thermal Response of Laser-Irradiated Tissue', ed. A. J. Welch and M. J. C. van Gernert, Plenum Press NY 1995 chapter 8.

For an (optically) thin homogenous material of thickness d the absorption coefficient is determined by measuring all the light intensity transmitted or scattered by the material, so that the only loss is due to absorption. In this case the absorption coefficient is given by $$\mu_a = -\frac{1}{d}\ln\left(\frac{I}{I_0}\right),$$

where $I_0$ is the incident light intensity and I the measured light intensity.

The scattering coefficient is similarly given by $$\mu_s = -\frac{1}{d}\ln\left(1-\frac{I_s}{I_0}\right),$$

where $I_S$ is the intensity of scattered light. The overall effect of the scattering of the PE element is that at least part of the radiation is absorbed in the predetermined volume, whereas another part of the radiation is transmitted further into the PE element (away from the volume). Part of this radiation transmitted further into the PE element is then scattered in a direction toward the predetermined volume. Naturally, this increases the intensity at the predetermined volume and at the interface.

This means that having this intensity increasing feature can be used in almost any process where e.g. laser irradiance is used, such as in:

1. Laser welding.
2. Laser welding of foils with little absorption where a third medium in the form of a scattering plate is placed beneath the foils to be welded.
3. Changing a surface property including: adhesion (tack, peel), absorption capacity of fluids (water), permeability for gases or fluids (porosity), cohesion, colour, appearance, odour, hydrophobicity, surface energy (contact angle), surface roughness, mechanical properties (elasticity, hardness, shear resistance, strength), friction coefficient, heat resistance, electrical conductivity, sound propagation (damping), optical properties, crystallinity, molecular orientation, molecular structure (cross linking, curing) etc.
4. Traditional laser marking.
5. Laser cutting and drilling, see e.g. U.S. Pat. No. 6,248,974 disclosing a method where an aerodynamic pattern is imparted to a golf ball by laser removal of excess material and U.S. Pat. No. 6,229,114 disclosing a process for precision patterning of an adhesive and cutting to a controlled depth.
6. Initiating any endothermic chemical reaction (at the surface or within the bulk).
7. Controlled release of initially bonded active substances into a transporting medium (e.g. adhesive). In this way the dose may be varied by means of laser radiation.
8. Photo activation of a biological component.
9. Laser debonding of glued/welded/bonded components (e.g. recycling of automotive parts).
10. Laser remelting to change mechanical properties or crystallinity somewhere in a surface region or within the bulk.
11. Laser patterning of polymers. One such method is seen in WO 02/23962 which discloses a method of forming a pattern on an insulating substrate made of organic polymer using a laser to irradiate and modify selected areas of the polymer. The application specifically describes that carbonisation and/or graphitisation of the polymer may make the polymer conductive, hence the method can be used to manufacture print boards (PCBs).
12. Optical recording media such as a CD-R or a DVD-R usually are multi layer structures comprising a (laser) transparent substrate, a recording layer, an interlayer (metallic), a pressure sensitive adhesive layer and a cover film. The recording layer typically contains an organic dye capable of absorbing light at the laser wavelength. Information is recorded on the media using a laser to locally heat the recording layer causing a physical or chemical change that alters the optical properties of the layer (a pattern is formed). Irradiating the media with a laser of the same wavelength used to write the information and measuring the specular reflectivity reproduces the information. These procedures are described in numerous patents, e.g. EP1331635.
13. UV-light induced processes such as cross-linking or photochemistry.
14. Laser surface treatment of polymers with the aim of modifying the surface properties such as Chemical modification, Structural modification, Surface roughening and/or reducing hydrophobicity. Surface roughening of a substrate is the major reason for the improved sticking of adhesives to a laser treated polymer surface. In addition, there is a large literature describing treatment of polymer pieces with electromagnetic radiation more generally before joining with an adhesive. This is usually referred to as a surface preparation technique and allows the bond strength of the joint to be varied.
15. Light activation of an adhesive by heat or electromagnetic radiation. One example is UV curing of acrylic adhesives, where the polymerisation is initiated by UV light. Another example is hot melt bonding, where heat is used to melt an adhesive (e.g. a thermoplastic) producing a low viscosity fluid that wets the surfaces of the pieces to be bonded.
16. Traditional optical lithography as used in the semiconductor industry where a UV-light source illuminates a substrate covered by photo resist through a mask defining a pattern. The exposure to UV-light changes the solubility of the resists in the developer allowing development of the pattern. A typical photo resist comprises a photosensitive material combined with a polymer and possibly organic solvents. More recent developments used higher energy radiation (X-rays) for enhanced resolution or UV/Excimer lasers.

Thus, it may be used for defining an area, a maximum depth, an intensity, or the like in or at which a predetermined effect takes place. The scattering provides a mirroring/reflecting effect providing a confinement of the radiation at the volume/interface.

This may be used for providing a number of types of products and effects. Also, naturally, it may be used for providing, from the same basic product, different versions of the product in that the radiation may be provided to a larger or smaller area/volume, to different areas/volumes, may be provided or not, whereby the effects, cuts, releases, weldings, debondings or the like (any of the above processes) may be provided in some versions and not in others. This is known in normal production.

In a preferred embodiment, the step of providing the PE element comprises providing the PE element with a predetermined substance at the interface and/or in the predetermined volume and wherein the step of providing the radiation comprises the substance absorbing radiation at the predetermined wavelength and converting the radiation to heat in the PE element.

In this embodiment, a further step may be provided of providing a second element adjacent to and abutting the interface, the second element having an absorption coefficient $\mu a2$ and a scattering coefficient $\mu s2$ at the predetermined wavelength. In this situation, the interface is an external surface of the PE element. This setup is basic and common to a number of specific applications.

A first such application is one wherein the step of providing the second element comprises providing a second element with $\mu a2 < \mu a$ and wherein the step of providing the radiation comprises providing the radiation to the predetermined volume through the second element. In this manner, the radiation is provided though the second element and to the volume or interface in order to provide the effect desired. This providing of the radiation through the second element is desirable due to the lower absorption coefficient therein. An alternative to the first application is one wherein the step of providing the second element comprises providing a second element with $\mu s2 > (1/10) * \mu a$ and wherein the step of providing the radiation comprises providing the radiation to the predetermined volume along a plane of the interface. Thus, a relatively high scattering makes it less desirable to launch the radiation through the second element due to the radiation loss or attenuation in the second element. The same would be the case for the PE element. Thus, the radiation is transported to the volume/interface along a plane of the external surface of the PE element and thereby not through the bulk of any of the PE element and the second element.

A third application is one wherein the step of providing the radiation comprises melting the PE element in the predetermined volume so as to weld the PE element and the second element to each other. Thus, subsequently, the two abutted elements will be welded together.

It is clear that the interface/external surface of the PE element and the second element may have any shape. In particular in the third application, the interface between the two elements may have any three-dimensional shape, and the weld may be provided anywhere desired in or at that three-dimensional shape.

A fourth application further comprises the step of providing a heat activatable adhesive (glue) at the interface between the PE element and the second element, and wherein the step of providing the radiation comprises heating the adhesive so as to attach the PE element to the second element. Thus, instead of welding (third application), an adhesive may be used for attaching the two elements to each other.

A fifth application is one wherein the step of providing the second element comprises providing the second element attached to the PE element (at the interface), and wherein the step of providing the radiation comprises heating the predetermined volume so as to melt material in the predetermined volume and at the interface in order to facilitate detachment of the PE element from the second element.

In addition, a number of more general applications exist, one being an application wherein the step of providing the radiation comprises evaporating and removing part of the PE element. In this manner, the PE element may be shaped by ablation/cutting due to the heating of the material. This heating may bring the material of the PE element to fluid or gas form and thereby facilitate removal of the heated material. In fact, the scattering may be used for delimiting the material to be removed in that it prevents absorption further into the material. This delimiting may be in three dimensions defining volumes to be removed.

Another general application is one wherein the step of providing the PE element comprises providing the PE element with a substance in the predetermined area and/or on the interface thereof, the substance being adapted to perform an endothermic reaction during the step of providing the radiation. This may be any endothermic reaction which may be desired on the surface of the PE element, inside or outside a wall/container holding the PE element or of which the PE element forms a part, or in the bulk of the PE element or a product of which the PE element forms a part.

Yet another general application is one wherein the step of providing the PE element comprises providing the PE element with a substance in the predetermined area and/or on the interface thereof, and wherein the step of providing the radiation comprises the substance absorbing the radiation at the predetermined wavelength and changing a colour (such as the absorption/reflection at visible wavelength(s)) thereof.

Again, the substance(s) may be a substance added to the PE element for this purpose or may be a substance normally forming part of the PE element for another purpose (colour, mechanical properties etc).

Another general application also mentioned above is one wherein the step of providing the radiation comprises the PE element absorbing radiation and changing a surface characteristic thereof at the interface. As mentioned above (items 3 and 14), this surface characteristic may be used for controlling e.g. adhesive properties and a large number of other parameters of the material. The use of radiation for providing these properties renders it possible to actually provide these properties at predetermined areas of the PE element—in a pattern, randomly or any manner desired.

An interesting application is one wherein the step of providing the radiation comprises a polymer of the PE element absorbing the radiation at the predetermined wavelength and changing a characteristic thereof. Items 11 and 13 above describe a number of characteristics of polymers which are controllable using radiation. Any known altering of a characteristic of a polymer (using radiation) is possible also using the PE element of the invention.

In one embodiment, the PE element, is a homogeneous material having at least substantially the same $\mu a$ and $\mu s$ throughout the PE element. Thus, there are no great variations in the absorption and scattering of the PE element, and these properties are experienced at all parts thereof. This makes manufacture easy in that the material of the PE element may be provided in bulk and subsequently shaped.

An alternative to that embodiment is one wherein the step of providing the PE element comprises providing a PE element comprising an upper layer having the absorption coefficient $\mu a$ and a lower layer having the scattering coefficient, $\mu s$. Preferably, the lower layer has an absorption coefficient lower than that of the upper layer, and the upper layer may have a scattering coefficient which is lower than or higher than $\mu s$.

In this manner, the different characteristics may be separated in the two layers. It should be noted that these layers may have any thickness and shape. The layers may be attached to each other or be detachable or unattached and be freely movable in relation to each other.

The upper layer may comprise or constitute any element or material which may be altered by radiation. This layer may be a thin sheet changing colour, a layer of adhesive, a layer of a radiation activated substance, a thicker layer of a material having in its bulk a radiation activatable substance, or the like. In fact, most or all of the above processes may be supported by this set-up.

One embodiment where the unattached assembly is interesting is one where the lower part is reusable for a number of upper parts. Thus, an upper part is positioned on the lower part and the radiation is provided in order to provide the desired radiation induced effect. The lower part provides the reflection of radiation transmitted through the upper part. When the radiation has been provided, the upper part may be removed and another one provided and subsequently processed.

In one instance, the step of providing the PE element comprises providing the PE element with the upper layer comprising a substance adapted to convert absorbed radiation to heat. This is useful for the above-mentioned welding, remelting, ablation, endothermic reactions, colour changes, alternations of polymers etc.

In another instance, the step of providing the radiation comprises photo activating a substance in the upper part. This may be suitable for activating biological components and parts of the surface changes described above.

One manner of providing the reflecting properties of the PE element is to have the step of providing the PE element comprise providing the PE element with a predetermined concentration or percentage of a particulate matter having a mean particle size of e.g. less than 10 times the predetermined wavelength, such as less than the predetermined wavelength, preferably less than half the predetermined wavelength. The presence of such particles in itself provides the scattering. Merely by controlling the particle size the scattering properties may be controlled. The desired penetration depth of the radiation into the PE element depends on the application. In general, if radiation penetrates the PE element and exits it, this is a waste of energy. In addition, this radiation should be handled as it may be dangerous to e.g. an operator. If the PE element is homogeneous, it is desired that the penetration depth is no more than e.g. 80%, such as no more then 50% of the thickness of the PE element in the direction of the radiation. If the PE element is divided into an upper, absorbing part and a lower, scattering part, it is desired that radiation does, in fact penetrate the upper part in order for the scattering part to have an effect. Then, however, it is desired that the scattering part has a penetration depth of no more than e.g. 80% of the thickness in the direction of the radiation in order to ensure that (at least substantially) no radiation is lost by transmission or forward scattering.

A second aspect of the invention relates to a radiation welded product comprising a first part and a second part welded together, wherein:
the first part has a high transmission at the predetermined wavelength and
the second part is a PE element and has an absorption coefficient, $\mu a$, and a scattering coefficient, $\mu s$, at the predetermined wavelength,
wherein $\mu s > (1/10)*\mu a$.

Thus, as is mentioned above, this combination of absorption and scattering has many advantages in e.g. welding.

Presently, a high transmission is a relative measure depending on a number of parameters, such as the thickness of the first part. Normally, as high a transmission as possible is desired in order to prevent heating and corresponding effects (such as a resulting deformation, decolouration etc) of the first part. However, some absorption is allowed and accepted in laser welding.

A third aspect relates to a radiation welded product comprising a first part and a second part welded together, wherein:
the first part has a high transmission at the predetermined wavelength,
the second part is a PE element and has an absorption coefficient, $\mu a$, at the predetermined wavelength, and
the second part has a scattering coefficient, $\mu s$, at the predetermined wavelength,
wherein $\mu s > 0.4$ mm$^{-1}$ and $\mu a < 4$ mm$^{-1}$.

Naturally, the larger the scattering of the second part the better an energy concentration at the interface between the first and second parts. In that situation, the absorption coefficient in the second part may be lower while still obtaining the desired energy absorption due to the reflecting properties.

In fact, $\mu s > 1$ mm$^{-1}$ and $\mu a < 1$ mm$^{-1}$ may be desired in a number of situations.

In any of the second and third aspects, preferably:
the first part further has a first scattering coefficient, $\mu s1$, at the predetermined wavelength, and
the second part has an upper part adjacent to the first part and a lower part, wherein:
the upper part has the absorption coefficient, $\mu a$, and the lower part has a third, respectively, absorption coefficient, $\mu a3$, at the predetermined wavelength, the absorption coefficient, $\mu a$, being larger than the first and third absorption coefficients, $\mu a1$ and $\mu a3$, respectively, and
the lower part has the scattering coefficient, $\mu s$, at the predetermined wavelength, the scattering coefficient, $\mu s$, being higher than the first scattering coefficient, $\mu s1$.

In this manner, the second part is actually two parts where the upper part has the primary object of providing the absorption and the lower part provides scattering. In that situation, all the advantages and preferences illustrated further above are valid.

A large number of manners exist of providing a two-part PE element of this type, such as two-component moulding, injection moulding, the painting of the upper layer/part on the lower part, the providing of the upper layer/part as a foil or sheet on the lower part and possibly fixing the two parts to each other (such as by laser welding simply heating the upper layer until it melts, the lower layer reflecting as described).

The upper part may, as described, be provided as is with the desired absorption or an absorbing substance may be added.

Preferably:
$\mu s3$ is at least 1.5, such as at least 2, preferably at least 4, such as at least 5 times $\mu s1$,
$\mu a$ is at least 1.5, such as at least 2, preferably at least 4, such as at least 5 times $\mu a1$, and/or
$\mu a$ is at least 1.5, such as at least 2, preferably at least 4, such as at least 5 times $\mu a3$.

Also, in each of the second and third aspects, the upper part may have a thickness being lower than $\mu a$ to the power of minus 1, such as lower than 0.8 times $\mu a$ to the power of minus 1, preferably lower than 0.5 times $\mu a$ to the power of minus 1. In that situation, it is ensured that radiation is, in fact, transmitted through the upper part in order for the lower part to provide its function.

In one embodiment, the second part comprises a predetermined concentration of a material having a mean particle size of at the most the predetermined wavelength. All materials scatter radiation, such as due to impurities or imperfections therein. However, in order to both obtain a sufficient and controllable reflection, addition of e.g. a powder is possible.

A fourth aspect relates to an ostomy product provided by any of the above-mentioned methods, and a sixth aspect relates to an ostomy product comprising any of the above products.

A number of demands are put to ostomy devices both to colour, prize, durability, adhesive properties, etc. The above products and methods are very well suited for use in ostomy products.

BRIEF DESCRIPTION OF THE DRAWINGS

In the following, preferred embodiments of the invention will be described with reference to the drawing, wherein.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
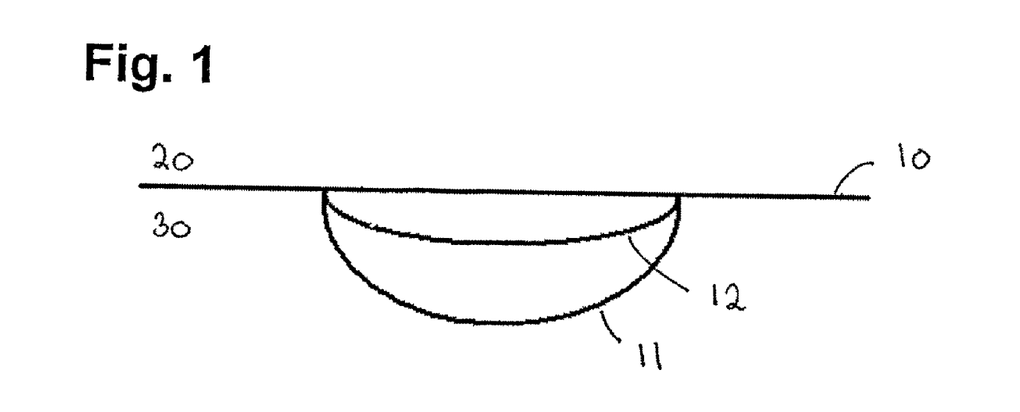
FIG. 1 illustrates laser welding of two parts.

FIG. 1 illustrates laser transmission welding of a transparent part 20 to an absorbing part 30. Laser light penetrates the upper transparent part 20 and is absorbed in the lower absorbing part 30 at an interface 10 between the two parts 20 and 30.

The absorption coefficient of the part 20 is preferably not too high in that this will cause absorption of radiation before reaching the interface where the radiation is desired. However, as long as the absorption of the part 20 does not damage this part, it may very well have both some absorption and scattering of the radiation.

Two lines, 11 and 12 are illustrated. These lines describe the penetration depth—or melted volume—of the radiation in two instances.

If the absorbing part 30 does not scatter laser light to any substantial degree, the light will penetrate to the depth illustrated by line 11.

If the absorbing part 30 also scatters laser light, the light penetration is reduced as illustrated by the line 12. This effect, naturally, is a gradual decrease of the penetration depth with the increase of scattering in the material 30.

The same total amount of energy is absorbed in the two cases implying that more energy is absorbed close to the interface 10 and hence a higher interface temperature is reached when scattering of laser light takes place in the material 30.

This effect may be used for decreasing the amount of absorber in the material 30. This may be desired in a number of applications where the colour of the materials 20 and 30 is of importance. It is difficult to find and incorporate absorbers in e.g. polymers, which absorbers have a sufficient absorption in e.g. the infrared region but only minor influence on absorption or reflection (colour) in the visible range.

Figure 2:
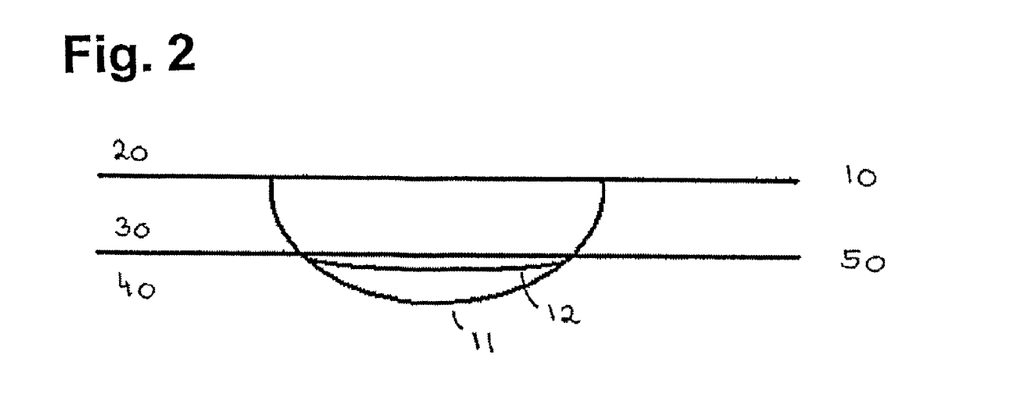
FIG. 2 illustrates laser welding of two parts having there between an absorbing layer.

In FIG. 1, the absorption and the scattering are both performed in the material 30 which may be homogeneous. These effects may, however, be separated. This is illustrated in FIG. 2, which illustrates laser transmission welding of three parts 20, 30 and 40.

In this situation, the function of the material 20 is the same, but the main absorption is now provided in the material 30, and two lines, 11 and 12, illustrate the penetration depth (melted volume) of the radiation when the material 40 has a sufficiently high scattering coefficient at the pertaining wavelength—or not. The material or part 40 need not have any absorption coefficient at the wavelength.

The parts 30 and 40 may be combined/attached into one part before welding or may form separate parts. Laser light penetrates the transparent part 20 and a part is absorbed in the absorbing part 30.

If the lower part 40 does not scatter laser light, the light will penetrate to the depth illustrated by line 11. If the lower part 40 also scatters laser light, the light penetration in 40 is reduced as illustrated by the line 12.

The same total amount of energy is absorbed in the two cases implying that more energy is absorbed in 30 and hence a higher interface temperature is reached at the interfaces 10, 50 when scattering of laser light takes place in 40.

It is seen that the material 30, in FIG. 2, may be used for attaching the materials 20 and 40 due to the even intensity distribution therein—and therefore the even temperature distribution which provides a good welding between the material 30 and each of the materials 20 and 40.

A test has been made with a set-up as seen in FIG. 1, and where the tensile strength of the weldings is tested.

Two types of materials are tested, where a first set of tests was made with a material 20 being the transparent material of the example below and the material 30 being the absorbing material of the below example. The thin line in FIG. 3 illustrates these tests.

In the second set of materials, the material 20 is again the transparent material of the example below and the material 30 is the absorbing and scattering material of the below example with a final TiO2 concentration of 2 wt. %. The fat line in FIG. 3 illustrates these tests. Thus, compared to the first set of materials, the material 30 contains an amount of TiO2 with a mean particle size of 300 nm that scatters the radiation.

The line energy (radiation intensity per distance—J/mm) was varied in order to see the effect on the intensity on the difference in scattering.

Figure 3:
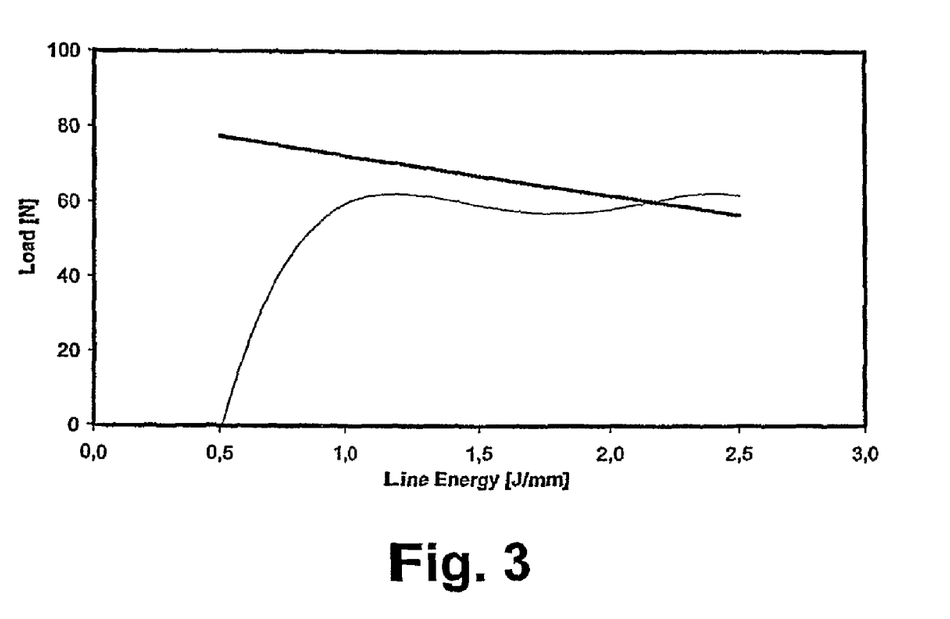
FIG. 3 illustrates peeling strength obtained in laser welding according to a preferred embodiment.

The results of FIG. 3 are quite clear in that it is seen that strong weldings are obtained at lower line energies when the material 30 comprises a higher scattering coefficient. This indicates that the scattering increases the radiation intensity at the interface so as to improve the weldings at lower energies.

At higher energies, it is seen by visual inspection of the samples that weldings with the first set of materials break due to breaking of the materials, where the weldings with the second set of materials peel, which indicates that the welds are the weak part and may have been made with a too high temperature.

Also, at high line energies, the material 30, in the first set of materials, is normally decolorized or damaged due to the large intensity absorbed through the material.

EXAMPLE

Three types of work pieces (49×49×1 mm^3) were made by injection moulding.

Transparent piece: Low-density polyethylene (LDPE, Engage 8401 from DuPont-Dow) or other types of polyethylene or polyethylene/ethylene-vinyl acetate co-polymers.

Absorbing piece: An amount of infrared absorber (PRO-JET 830 NP from Avecia) corresponding to a total final concentration of 0.02 wt. % was dissolved in a small amount of mineral oil and mixed with Engage 8401.

The PRO-JET 830 NP has a maximum absorption at a wavelength of 800 nm with a spectral full-width-half-maximum of ~110 nm and it can be readily mixed with polyethylene. At a concentration of 0.02 wt. % in polyethylene, the absorption coefficient ($\mu_a$) and scattering coefficient ($\mu_s$) at 800 nm are ~0.9 mm$^{-1}$ and ~0.3 mm$^{-1}$, respectively.

Infrared absorbers for laser welding of polymers should be mixable with the polymers and with a concentration resulting in sufficient absorption and scattering at the laser-welding wavelength. Commercial laser diodes for laser welding typically have emission wavelengths in the range from 800 nm to 980 nm. Infrared absorbers with sufficient absorption in this wavelength range can be selected from groups of nitroso, cyanine, nigrosine, triphenylmethane, imminium and diimminium, squaurilium and croconium, nickel dithiolenes and related compounds, quinone, phtalocyanine, azo, indoaniline, and others. The structural formulas of such compounds can be found e.g. in *Infrared Absorbing Dyes*" (*Topics in applied chemistry*), ed. M. Matsuoka, Plenum Press, New York, 1990. Such dyes may be modified in order to be mixable with the polymers to be welded or they may be produced in a pigmented form, which subsequently is mixed with the polymers. Methods of mixing dyes with polymers include coprecipitation of the dye with the polymers in a solvent or in high vacuum [see e.g. T. Hiraga et al. *"Properties and application of organic dye associates in polymer matrices", Thin Solid Films* 273 (1996) 190-194]. Alternatively, dye molecules may be covalently linked to the polymeric chains [see e.g. A. Costela et al. *"Efficient and highly photostable solid-state dye lasers based on modified dipyrromethene. $BF_2$ complexes incorporated into solid matrices of poly(methyl methacrylate), Appl. Phys. B* 76 (2003) 365-369].

Absorbing and scattering piece: A master batch containing 10 wt. % Pigment White 6 (untreated rutile TiO2 with a mean crystallite size of 300 nm such as PRETIOX R-200 M from PRECOLOR a.s.) in Engage 8401 was made by compounding. Various amounts of master batch were mixed with Engage 8401 and an amount of PROJET 830 NP dissolved in mineral oil corresponding to a total final concentration of 0.02 wt. %.

Laser welding experiments were performed using a diode laser with a wavelength of 808 nm, a beam diameter of 2 mm and various combinations of power and speed.

Tensile testing was performed on welded pieces. FIG. 3 shows the load at failure as a function of line energy defined as power/speed.

Measurement of the diffuse reflectance and total transmittance were made using an integrated sphere set-up as described e.g. by B. C. Wilson in 'Optical-Thermal Response of Laser-Irradiated Tissue', ed. A. J. Welch and M. J. C. van Gemert, Plenum Press NY 1995 chapter 8

The measured data were converted to absorption and scattering coefficients using the adding-doubling algorithm assuming isotropic scattering and an index of refraction of 1.5 (S. A. Prahl: "Optical property measurements using the inverse adding-doubling algorithm", Oregon Medical Laser Center, Portland Oreg., January 1999 http://omic.ogi.edu/software/iad/index.html)

|  | $\mu_a$ (mm$^{-1}$) | $\mu_s$ (mm$^{-1}$) |
| --- | --- | --- |
| LDPE | ~0.1 | ~0.1 |
| LDPE + absorber | 0.9 | 0.3 |
| LDPE + absorber + 0.25% TiO2 | 0.9 | 2.2 |
| LDPE + absorber + 0.5% TiO2 | 0.9 | 2.8 |
| LDPE + absorber + 1% TiO2 | 0.9 | 4.8 |
| LDPE + absorber + 2% TiO2 | 0.9 | 11.0 |

The table shows absorption and scattering coefficients measured on a number of different samples with and without absorber (PRO-JET 830 NP) and containing various amounts of TiO2.

Other Uses of the Invention

The effect of the scattering in the material 30/40 of FIGS. 1 and 2 may, naturally, be used for any of a large number of other purposes where a heating or a higher radiation intensity is desired:

Laser Welding:

For welding of partially absorbing foils where light penetrates through all foils, a scattering support (ceramics) may be used to reflect/backscatter the light that passed through. In this way the optical path length within the foils are increased and so is the absorption/heating.

Laser Surface Modification

In a recently submitted PCT application PCT/EP2005/050328, a number of applications of heat treatment of adhesive surfaces were discussed. All these processes may be mediated by the use of absorbers as described in the application, the use of scattering particles may be used to optimise the process. Laser heat treatment may be used for e.g.

Changing adhesive properties (peel adhesion, tack absorption of water and body fluids).

Marking of the adhesive (change of colour and appearance).

Change of surface properties (surface energies, hydrophobicity, roughness, optical properties (reflection coefficient)). Very often a surface is heat treated with a laser prior to application of glue.

Laser Induced Chemistry

One type of application relates to photo-chemistry, photo induced cross-linking and curing. This is usually done with UV (Excimer) lasers but sometimes also with heat generated by IR/NIR lasers. If light penetration is reduced this may effectively increase the efficiency of a given light induced process. Curing (of hot melt adhesives) is used for bonding of pieces and is an alternative to welding widely used in the medical device industry.

Another type of application is bond-breaking and change of molecular orientation and conformation. For conducting polymers it is known that the molecular orientation and the presence of side groups determine the conductivity. One may envisage that circuits can be "printed" by laser writing of conducting polymers. Otherwise an unconducting polymer surface may be rendered conducting by graphitisation (heating) by a laser beam. This also provides a method to produce prints. Electronic circuits may be relevant in connection with e.g. sensor applications for medical devices.

Bond breaking is also the crucial process in laser debonding, where e.g. two glued components can be separated (recycling) by laser induced destruction of the glue. If the glue does not have sufficient absorption in it self then adding scatterers may help.

Laser Induced Physics

By laser remelting it is possible to change the mechanical properties of foils and polymer surfaces. This may be used e.g. as a substitute to perforation (to induce flexibility in e.g. an adhesive wafer construction where the strength is given by a foil). Another application is to change the crystallinity of a foil/surface region by heating/melting. This could influence the visual appearance or improve the process ability of a following process such as welding (heat, laser or otherwise)

Laser Induced Activation of Active Substances

Active substances may be immobilised in different kinds of chemical complexes or physically separated from the surface. Using heat it is then possible either to mobilise the substance or allow diffusion towards the surface. This concept provides two features. First, if a laser is used then the dose can be determined by the area heated, this is an easy way to produce products with many dose levels. Second, for use in hospitals or otherwise the active substance may be activated just prior to application of e.g. a plaster.

Photo activation of an active component (photo chemistry, substance is not immobilized but plainly inactive before irradiation) follows along the same lines.

Backscattering

Backscattering of the light may be obtained from a highly scattering part of the material placed at a certain depth from the surface. One may say that the buried interface acts like a mirror.

This configuration is useful for welding as described above. It can also be used e.g. for drilling/cutting/ablation purposes (IR/NIR/VIS and UV lasers) where the 'mirror-interface' effectively determines the depth of the hole drilled or the cut made.

The scattering and absorption coefficients may be chosen in a way that the highest temperatures are actually achieved at the buried "mirror interface" and not at the surface. This may be useful for activation of active substances and laser debonding (see above).

In CD or DVD technology a reflective metallic layer is actually used. According to this invention the metal layer may be replaced by a scattering layer (which is cheaper and easier to apply).

Side Illumination

Figure 4:
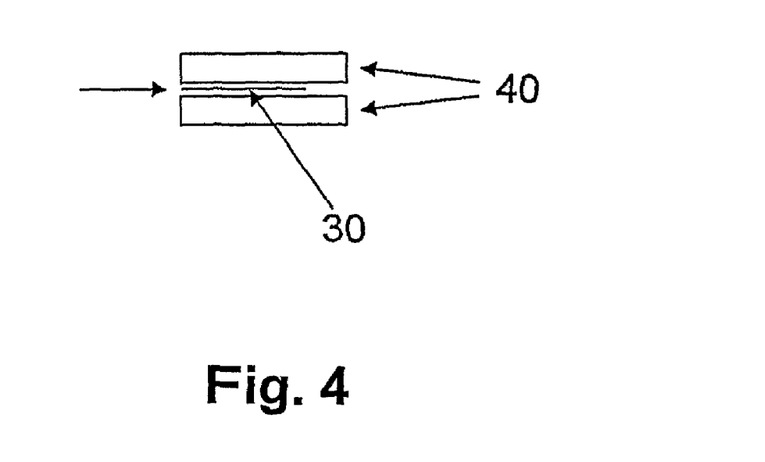
FIG. 4 illustrates another manner of e.g. welding where the two elements have a high scattering coefficient.

A particular embodiment is one where radiation is desired in a thin layer or at an interface. In this manner, two reflecting members may be positioned adjacent to the interface, as is illustrated in FIG. 4. The two scattering elements 40 are positioned on either side of the absorbing element 30.

The elements 40 have a scattering coefficient which is so high that it is not desired to launch the required amount of radiation there through in order to have the desired intensity at the element 30. Therefore, the radiation is provided to the element 30 as illustrated by the arrow.

The two scattering elements 40 now act to maintain a "high" radiation intensity at the element 30 also a given distance away from the interface at which the radiation enters the system in that the scattering of the radiation will tend to keep a relatively high radiation intensity at the material 30.

This type of system may be used for most of the aspects mentioned above, such as for welding, debonding, changing properties of the material 30, the bulk thereof or the surface thereof, sustained release of agents therein, changes of a polymer of the material 30 or the like.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A method of providing a product, the method comprising:
    providing a polyethylene (PE) element including an upper layer having an absorption coefficient, $\mu a$, and a lower layer having a scattering coefficient, $\mu s$, at a predetermined wavelength, where $\mu s > (1/10) * \mu a$;
    providing a second element adjacent to and abutting an interface with or surface of the PE element, the second element having an absorption coefficient $\mu a2$ and a scattering coefficient $\mu s2$ at the predetermined wavelength with $\mu a2 < \mu a$;
    providing radiation at the predetermined wavelength through the second element to a predetermined volume at or near the interface with or surface of the PE element, said radiation melting the PE element in the predetermined volume so as to weld the PE element and the second element to each other.

2. The method according to claim 1, wherein the step of providing the PE element includes providing the PE element with a predetermined substance at the interface and/or in the predetermined volume and wherein the step of providing the radiation includes the substance absorbing the radiation at the predetermined wavelength and converting the radiation to heat in the PE element.

3. The method according to claim 1, wherein the step of providing the second element includes providing a second element with $\mu s2 > (1/10) * \mu a$ and wherein the step of providing the radiation includes providing the radiation to the predetermined volume along a plane of the interface.

4. The method according to claim 1, the method including the further step of providing a heat activatable adhesive at the interface between the PE element and the second element, and wherein the step of providing the radiation includes heating the adhesive so as to attach the PE element to the second element.

5. The method according to claim 1, further comprising the step of heating the predetermined volume so as to melt material in the predetermined volume and at the interface in order to facilitate detachment of the PE element from the second element.

6. The method according to claim 2, wherein the step of providing the radiation further includes evaporating and removing part of the PE element.

7. The method according to claim 2, wherein the step of providing the PE element includes providing the PE element with a substance in the predetermined area and/or on the interface thereof, the substance being adapted to perform an endothermic reaction during the step of providing the radiation.

8. The method according to claim 1, wherein the step of providing the PE element includes providing the PE element with a substance in the predetermined area and/or on the interface thereof, and wherein the step of providing the radiation includes the substance absorbing the radiation at the predetermined wavelength and changing a color of the substance or PE element.

9. The method according to claim 1, wherein the step of providing the radiation includes the PE element absorbing radiation and changing a surface characteristic thereof at the interface.

10. The method according to claim 1, wherein the step of providing the PE element includes providing the PE element with the upper layer including a substance adapted to convert absorbed radiation to heat.

11. The method according to claim 1, wherein the step of providing the radiation includes photo activating a substance in the upper layer.

12. The method according to claim 1, wherein the step of providing the PE element includes providing the PE element with a predetermined concentration or percentage of a particulate matter having a mean particle size of less than 10 times the predetermined wavelength.

13. The method according to claim 1, wherein the product is an ostomy product.

14. A radiation welded product comprising:
    a first part and a second part welded together;
    the first part having a high transmission, a first absorption coefficient, $\mu a1$, and a first scattering coefficient, $\mu s1$, at a predetermined wavelength; and the second part including a polyethylene (PE) element having an upper part adjacent to the first part and a lower part;

the upper part having a second absorption coefficient, $\mu a2$, and the lower part having a third, respectively, absorption coefficient, $\mu a3$, at the predetermined wavelength, the absorption coefficient, $\mu a2$, being larger than the first and third absorption coefficients, $\mu a1$ and $\mu a3$, respectively; and the lower part having a scattering coefficient, $\mu s$, at the predetermined wavelength, the scattering coefficient, $\mu s > \mu s1$ and $\mu s > (1/10)*\mu a2$.

15. The product according to claim 14, wherein the second part includes a predetermined concentration of a material having a mean particle size of at the most 10 times the predetermined wavelength.

16. The product according to claim 14, wherein the product is an ostomy product.

17. A radiation welded product comprising:

a first part and a second part welded together;

the first part having a high transmission, a first absorption coefficient, $\mu a1$, and a first scattering coefficient, $\mu s1$, at a predetermined wavelength;

the second part including a polyethylene (PE) element having an upper part adjacent to the first part and a lower part;

the upper part having a second absorption coefficient, $\mu a2$, and the lower part having a third, respectively, absorption coefficient, $\mu a3$, at the predetermined wavelength, the second absorption coefficient, $\mu a2$, being larger than the first and third absorption coefficients, $\mu a1$ and $\mu a3$, respectively, and $\mu a2 < 4$ mm$^{-1}$, and the lower part having a scattering coefficient, $\mu s$, at the predetermined wavelength, the scattering coefficient, $\mu s > \mu s1$, $\mu s > 0.4$ mm$^{-1}$.

18. The product according to claim 17, wherein the second part includes a predetermined concentration of a material having a mean particle size of at the most 10 times the predetermined wavelength.

19. The product according to claim 17, wherein the product is an ostomy product.

* * * * *